March 18, 1969 — G. W. VAN LEER — 3,433,652
PACKAGE FOR FOODSTUFFS
Filed March 29, 1966
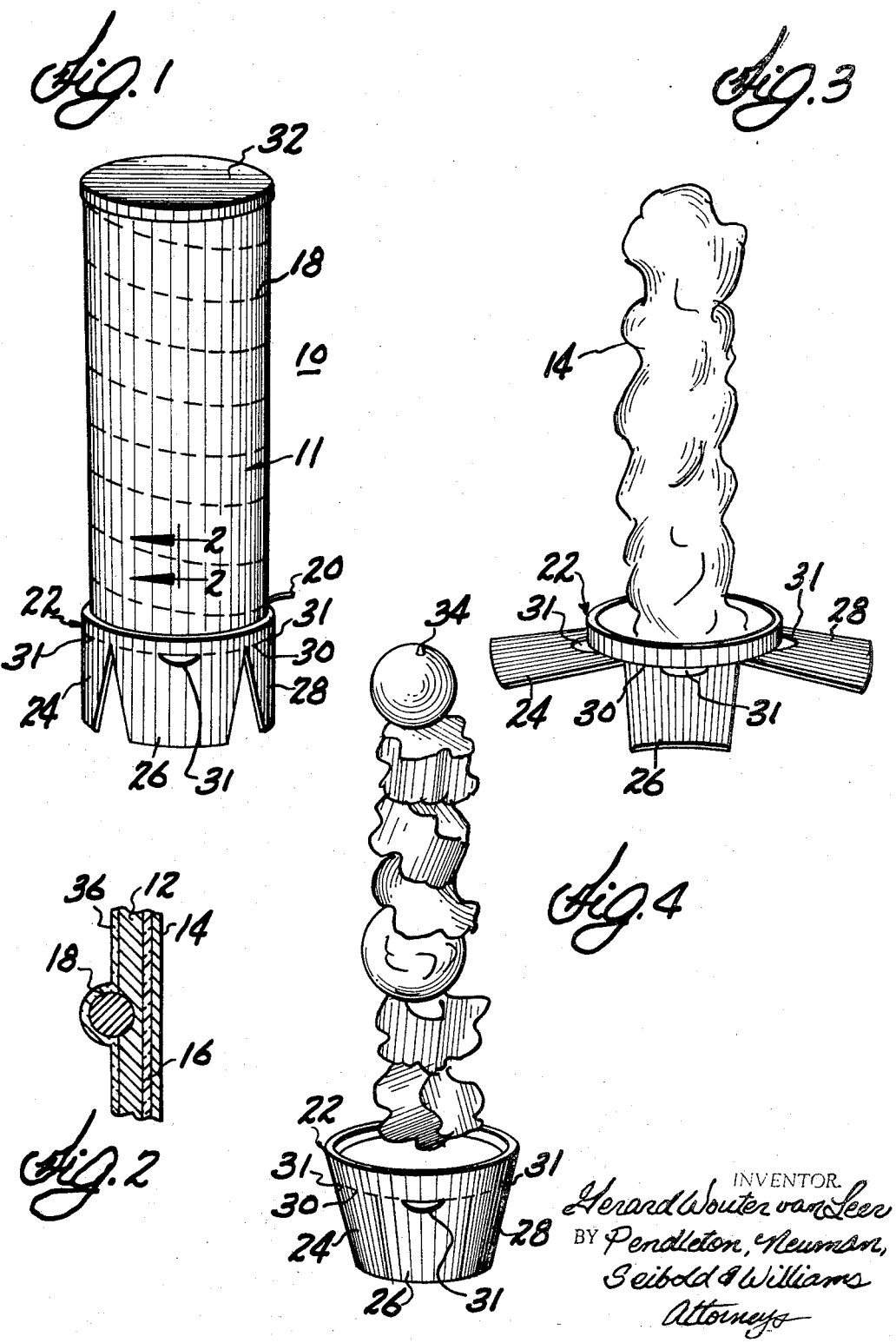

United States Patent Office 3,433,652
Patented Mar. 18, 1969

3,433,652
PACKAGE FOR FOODSTUFFS
Gerard Wouter van Leer, 1850 N. Fremont Ave.,
Chicago, Ill. 60614
Filed Mar. 29, 1966, Ser. No. 538,303
Claims priority, application Netherlands, Mar. 31, 1965,
6504094
U.S. Cl. 99—171                        10 Claims
Int. Cl. B65b 25/22

ABSTRACT OF THE DISCLOSURE

Self-heating food package including a sealed enclosure with an outer combustible layer and an inner noncombustible liner. The combustible layer may be ignited by a wick which is attached to the combustible layer. A support member is secured to one end of the package and a food retaining member is mounted on the support member and is disposed within the enclosure.

---

This invention relates to a new and improved package for containing preserved or precooked food and, in particular, relates to a package in which the food may be both stored and prepared and the means for heating the food are incorporated in the package.

Various packages for containing preserved or precooked foods, such as freeze-dried and frozen foods, are available. For example, containers for frozen foods have been used in which the food could be prepared without removal from the package. With these packages, however, the food, in order to be prepared, would have to be heated in some kind of a cooking means, such as an oven, pot or similar vessel.

Accordingly, the present invention has as an object the provision of a package for preserved or precooked foodstuffs in which the food can be prepared without being removed and without the need of any cooking vessel or other external heating means. The invention has as a further object the provision of a package for containing freeze-dried foods in which the freeze-dried food can be reconstituted in the package and the reconstituted food prepared without being removed from the package. Still another object of this invention is to provide a package which contains a skewer with Kabob or other food mounted thereon, which may be heated on the skewer without removal from the package and, after heating, may be consumed directly from the skewer. A further object is to provide a package of preserved or precooked food which is useful for quick meals or snacks with a minimum of preparation. It is a further object of this invention to provide a package of preserved or precooked food which is especially useful in vending machines and for use by vendors, restaurants, campers, picnickers, the military, and in many other applications. Further and additional objects will become manifest from the drawing, description and appended claims.

In general, the present invention comprises a package having an enclosure consisting of a combustible covering layer with an inner lining of noncombustile material. The enclosure may be cylindrically shaped with each end sealed so as to form a moistureproof package. The enclosure preferably contains a skewer therein on which Kabob or other food is placed. The skewer is connected to one of the ends of the enclosure, which end may be formed into a handle after the food in the package is prepared and ready for consumption. A wick is embedded in the combustible layer of the enclosure with one end of the wick extending therefrom. When the food in the package is freeze-dried, the enclosure should be of such size, or so calibrated, that a proper amount of reconstituting liquid may be easily introduced therein. After the reconstituting liquid is added to the freeze-dried food, the wick is ignited causing the combustible layer of the package to ignite and burn. This creates sufficient heat to effectively warm or finish cooking the food in the package. After the food is heated, the inner lining of noncombustible material is removed and the food is ready to be eaten directly from the skewer. The base is preferably provided with flaps which may be extended outwardly to form a stable support during the heating process and which may be folded inwardly to form a convenient grip for holding the skewer after the food has been prepared.

For a more complete understanding of this invention, drawings have been provided wherein:

FIG. 1 is a perspective view of an embodiment of this invention;

FIG. 2 is a cross-section taken along line 2—2 of FIG. 1;

FIG. 3 is a perspective view of the embodiment of FIG. 1 with the base flaps extended so as to form a support for the package and after the combustible covering of the package has been burned away;

FIG. 4 is a perspective view of the embodiment of FIG. 1, showing the food after it has been heated and the noncombustible layer has been removed, and showing the base formed into a handle.

Referring now to the drawings, and more particularly to FIGS. 1 and 2, a package 10 is shown comprising a cylindrical enclosure 11 having a layer of combustible material 12, such as cardboard, and a layer of noncombustible material 14, such as aluminum foil or other metal foil, laminated to the cardboard by a sealing material 16 such as a flammable wax or the like. The combustible layer 12 must burn hot enough and long enough to heat or finish cooking the precooked food. The foil layer 14 must be capable of conducting enough heat to properly prepare the food, but not so much as to burn the food. Layer 14 also serves to protect the food from any ash resulting from the combustion of layer 12. Embedded in the cardboard layer is a wick 18 which preferably coincides with the juncture lines formed in the cardboard when it is shaped into a cylinder, as shown in FIG. 1. The wick is thus wrapped around the enclosure 11 in such a way that it defines a helix. One end of the wick 20 extends from the package to provide means for igniting the package. A base 22 is provided, sealing the bottom of the enclosure 11 and having flaps 24, 26, 28, and a fourth flap not shown in the drawings, all of which are foldable along a scoreline 30. Each flap is tapered so that the free end is the narrowest portion and the part which folds along the scoreline 30 is the widest portion. Cut-outs 31 are provided to facilitate folding. A lid 32 seals the upper part of the enclosure 11 of package 10.

FIG. 3 shows the package after the combustible layer has been burned away and the food therein has been prepared. The metal foil layer 14 still remains about the food, thereby keeping it warm. The flaps 24, 26, 28 and the flap not shown have been folded outwardly to provide a stable support for the package during the burning process. FIG. 4 shows the package with the foil layer 14 removed and the flaps folded inwardly along line 30 so that the lateral edges of the flaps are joined and the flaps form a continuous surface and a neat, tapered handle. The food is held in place by a skewer 34, which is attached to the base 22 by means sufficient to prevent the skewer with the attached food from becoming disconnected from the base 22 or otherwise shifting its position relative thereto. Thus, the skewer with attached food may be conveniently gripped by the handle formed from the base, and the cooked food may be consumed directly from the skewer, eliminating the necessity of using dishes or other eating utensils.

When the package 10 of this invention contains freeze-dried food, the food must be reconstituted before consumption. This is accomplished by removing lid 32 and introducing water, wine, beer or other reconstituting liquid into the enclosure 11. The end 20 of wick 18 is then ignited, the combustible portions of the package 10 burn, and the reconstituted food is heated and thereby prepared. The volume of the enclosure 11 may be manufactured so that the unoccupied interior space will hold exactly the amount of reconstituting liquid necessary to reconstitute the freeze-dried food in the package. Alternatively, the interior of the package could be provided with a measuring line calibrated to indicate the level to which the package is to be filled with reconstituting liquid.

As aforenoted, the combustible layer 12 may be cardboard or another combustible product, and it is preferably a material which will form little or no ash upon burning. Where it is desired to print on the combustible layer, this layer, after printing, may be covered with a varnish 36, preferably of the kind generally used as coating for labels. The varnish should also be combustible. If desired, the entire package may be encased within an overwrap or dipped in a sealing compound to further insure moistureproofness or to facilitate vacuum packing, if such packing is employed.

While the invention is described as being used with freeze-dried foods, it will be understood that other preserved foods, such as frozen foods, could be used in connection with this invention. Of course, if frozen foods are used, the package will have to be stored in a freezer, rather than at room temperature, and the food would probably have to be thawed before heating and actual use.

While several embodiments of this invention are shown above, it will be understood that the invention is not to be limited thereto since many modifications may be made which fall within the true spirit and scope of this invention. It is contemplated, therefore, that any such modifications shall be covered by the appended claims.

What is claimed is:

1. A self-heating package for storing and heating preserved foods comprising a sealed enclosure including an outer combustible layer adapted to burn and provide sufficient heat to prepare the preserved food and an inner, noncombustible, peelable layer adapted to conduct the heat from the outer layer to the preserved food and to be peeled from the food after heating, said outer combustible layer being coextensive with said noncombustible layer; an igniting means surrounding said outer layer and in substantial contact therewith; a support member located at one end of the package for stabilizing the same while the food is being heated and adapted to be used as a handle after the heating has been completed; and a food retaining means secured to said support member and disposed within said enclosure.

2. The article of claim 1 wherein the enclosure is cylindrical.

3. The article of claim 1 wherein the combustible layer of the enclosure is cardboard, and the inner layer of noncombustible material is metal foil.

4. The article of claim 3 wherein the cardboard is laminated to the metal foil.

5. The article of claim 4 wherein the means attached to the combustible layer for igniting and burning said layer is a wick embedded in the cardboard layer, a portion of said wick protruding from the cardboard layer.

6. The article of claim 1 wherein the means for retaining the food in place in said enclosure is a skewer.

7. The article of claim 6 wherein the means for stabilizing and gripping the package comprises means adapted to close one end of the enclosure and to be attached to one end of the skewer, and flaps connected to said means, said flaps being adapted to fold outwardly to form a support for the package when the food is being heated and to fold inwardly so as to form a handle for gripping the skewer after the food is heated.

8. The article of claim 7 wherein each of the flaps has tapered lateral edges so that the free end of each flap is narrower than the remainder thereof, and the edges join together to form a continuous surface when the flaps are folded inwardly.

9. The article of claim 1 wherein the food in said package is freeze-dried and the enclosure is liquid-tight and adapted to receive a reconstituting liquid to reconstitute the food.

10. The article of claim 9 wherein the enclosure is cylindrical and adapted to receive a predetermined amount of reconstituting liquid to reconstitute the food, and the means attached to the combustible layer for igniting and burning said layer is a wick defining a helix on the enclosure.

References Cited

UNITED STATES PATENTS

| 2,606,547 | 8/1952 | Stofel | 126—262 |
| 3,135,614 | 6/1964 | Parisi et al. | 99—192 |

A. LOUIS MONACELL, *Primary Examiner.*

WARREN BOVEE, *Assistant Examiner.*

U.S. Cl. X.R.

99—174; 126—262